April 21, 1931.  C. E. CHALMERS  1,801,796
FARE COLLECTING MACHINE
Original Filed April 13, 1923   9 Sheets-Sheet 9
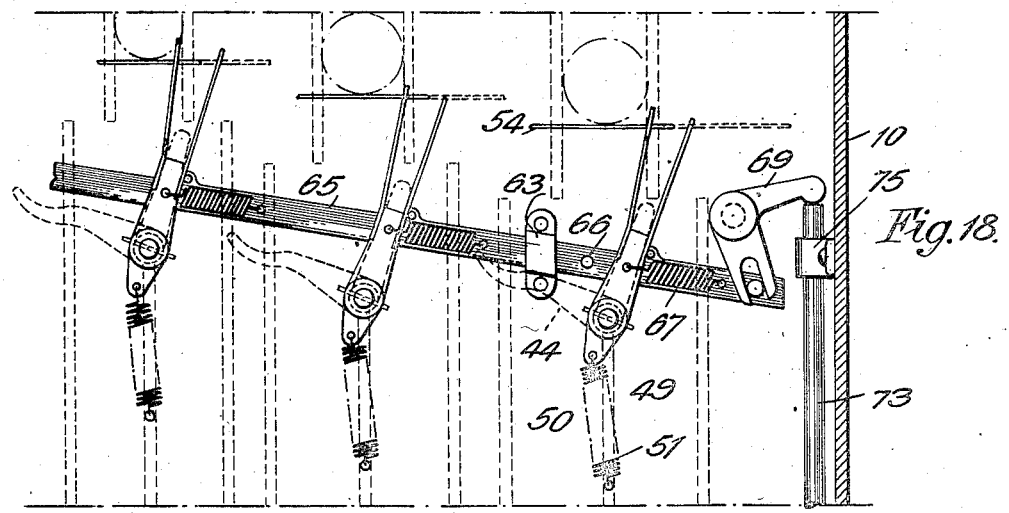
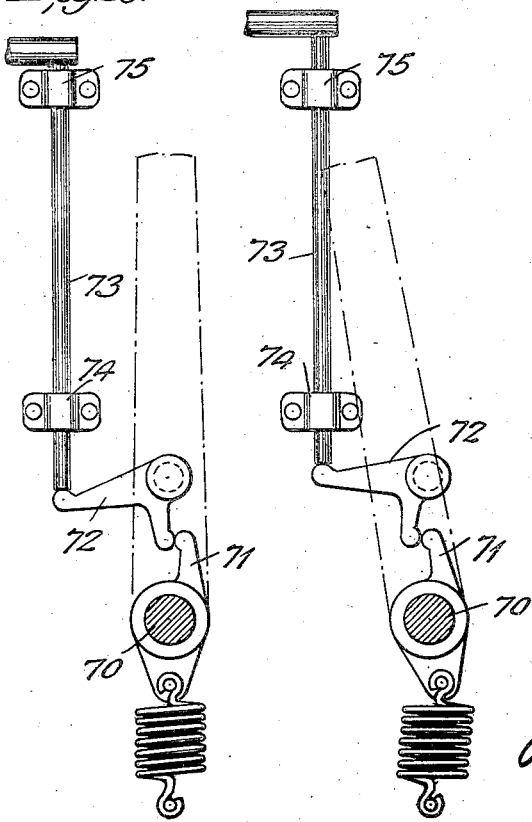
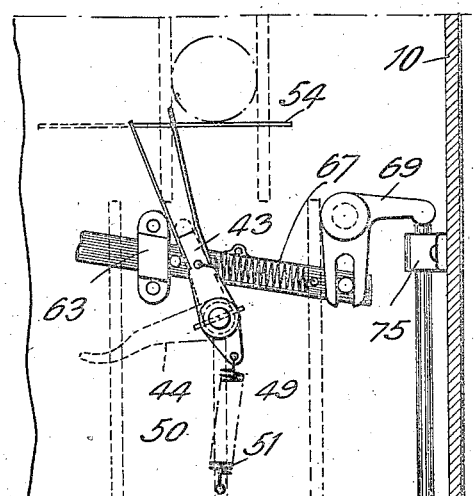
INVENTOR
Charles E. Chalmers
BY
Bohbers Ledbetter
ATTORNEYS Patented Apr. 21, 1931

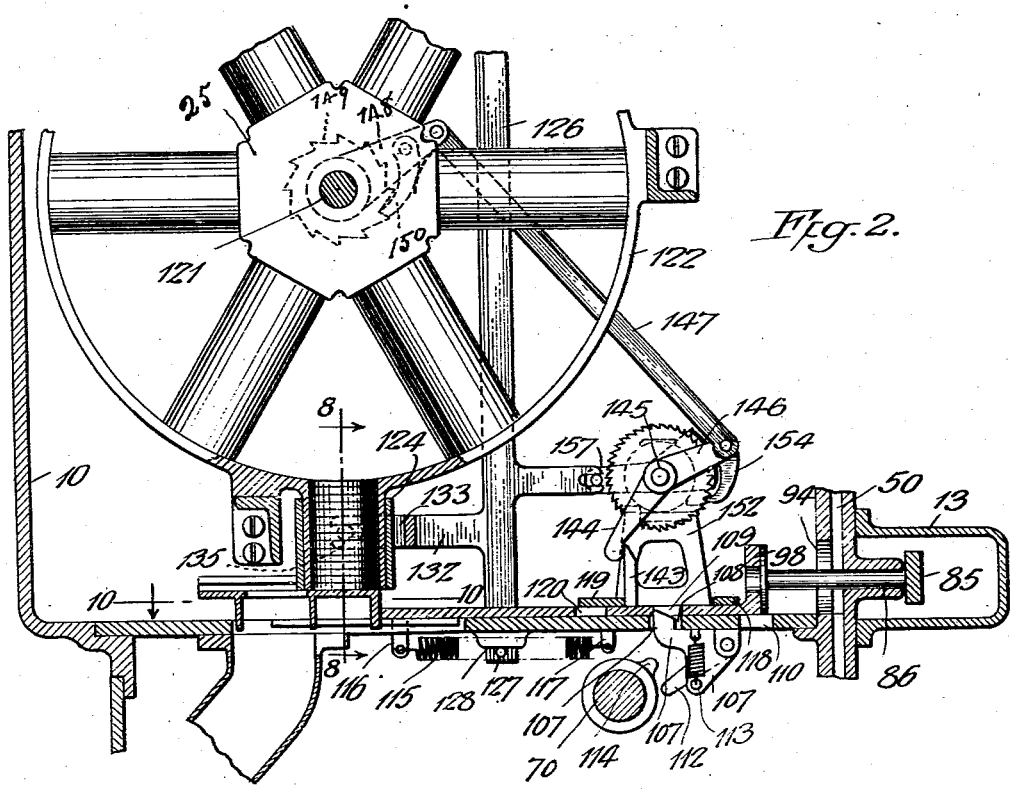
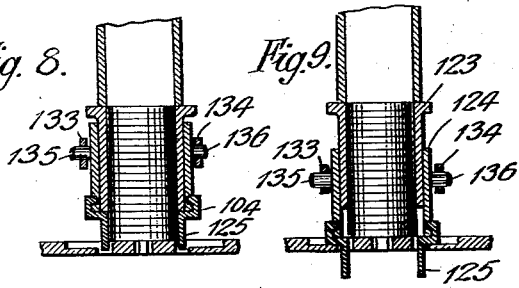
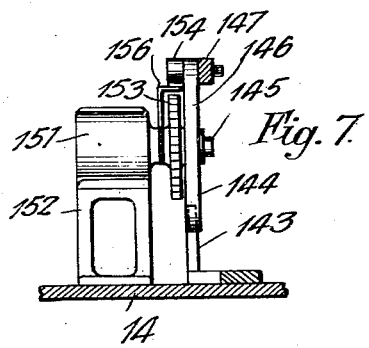
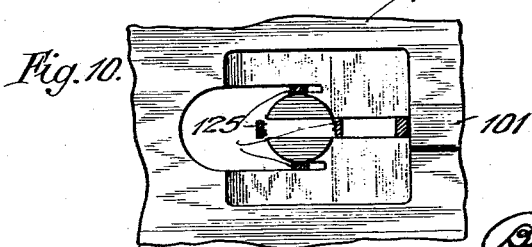

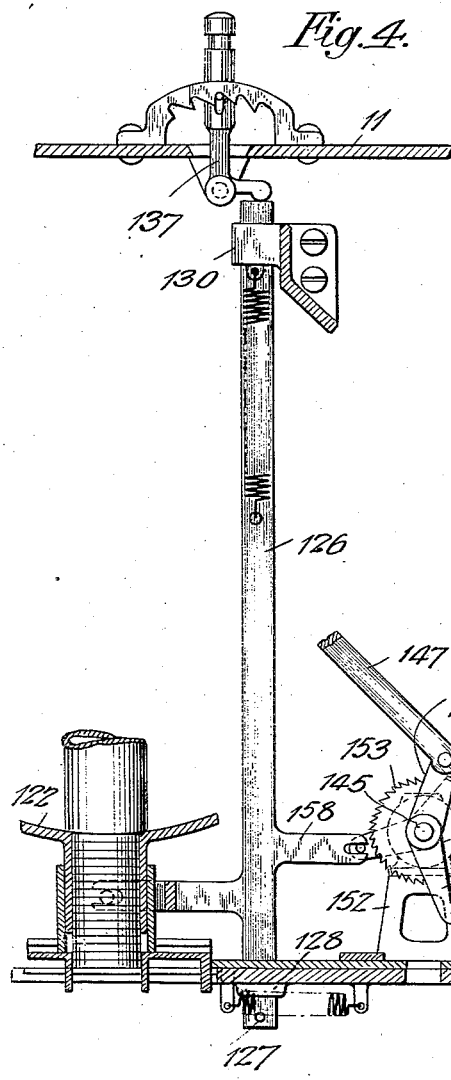
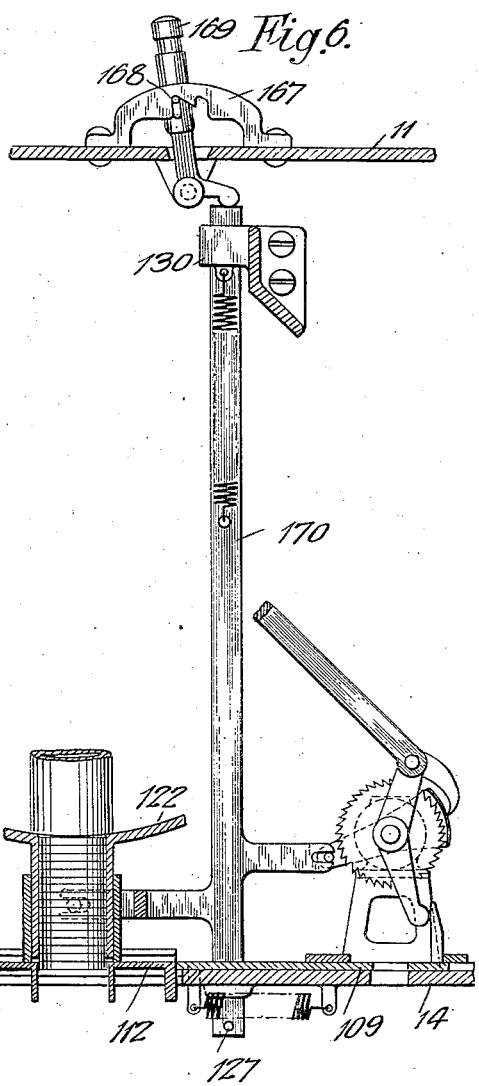
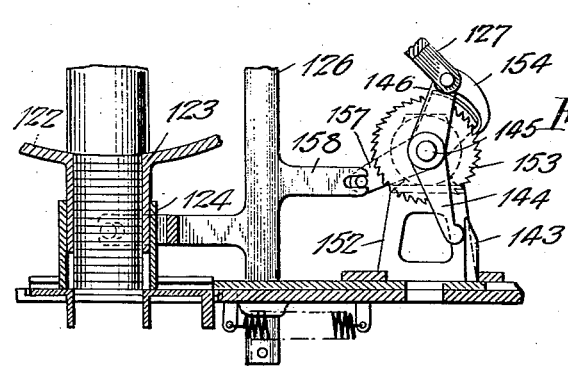

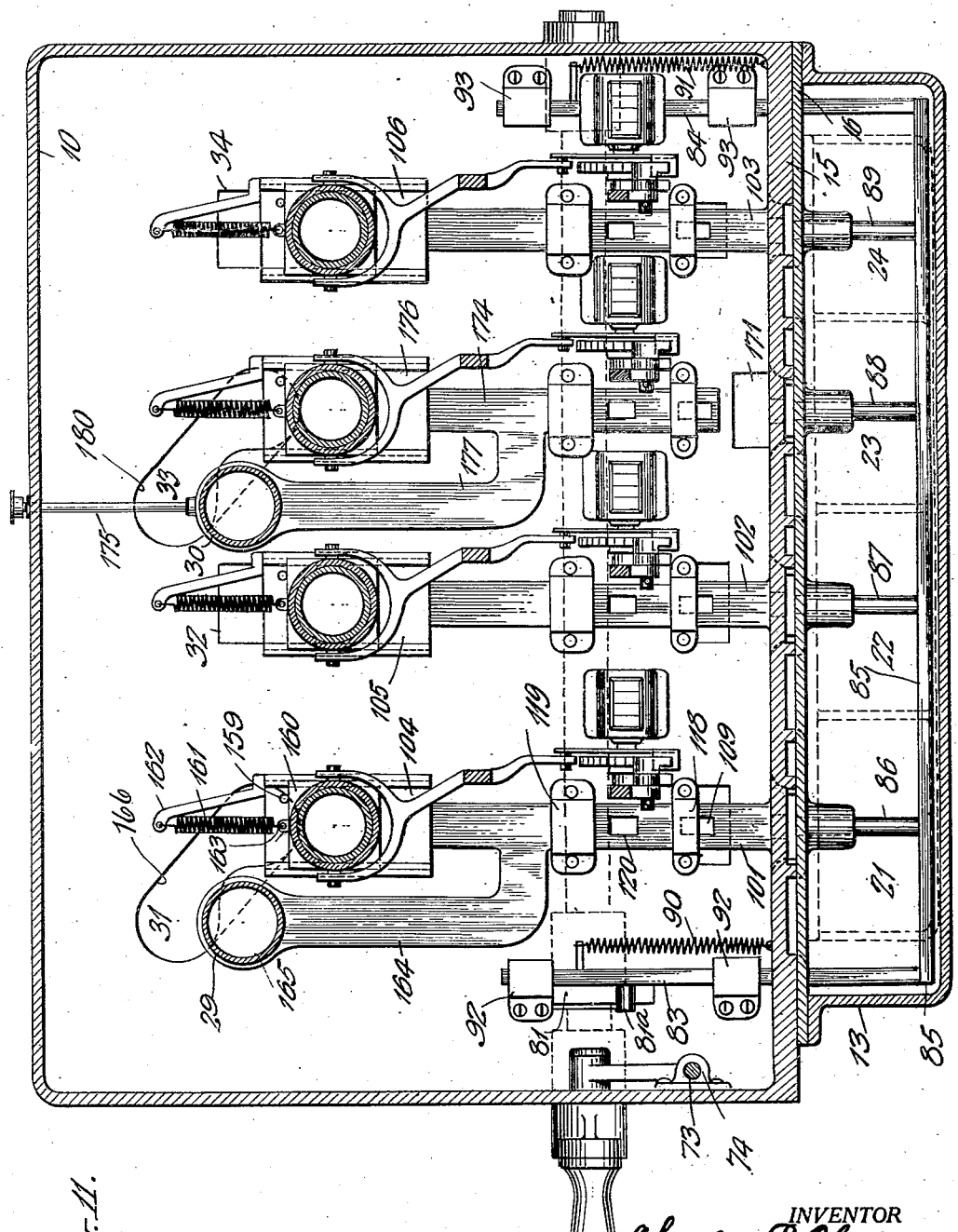

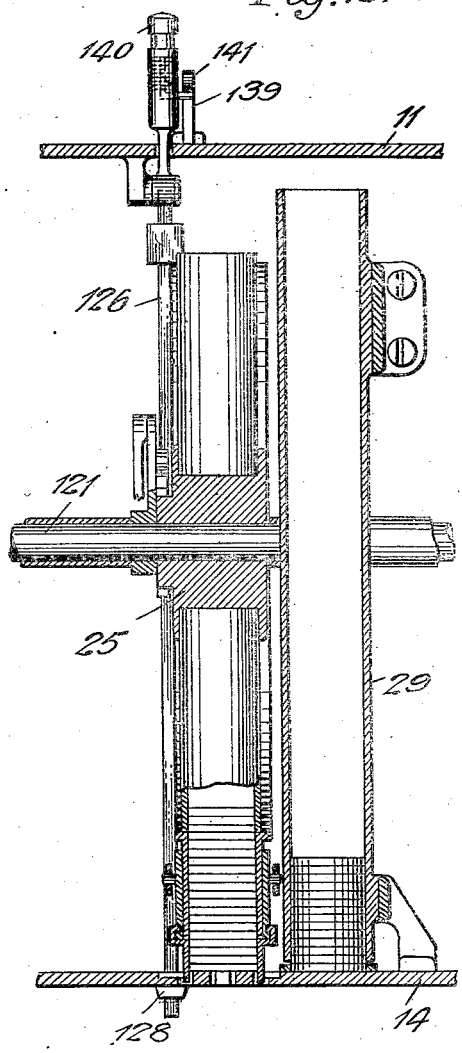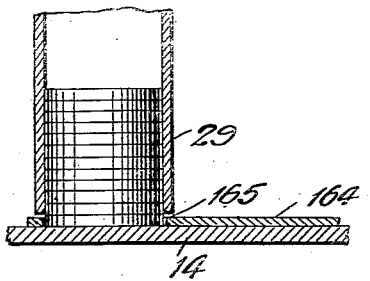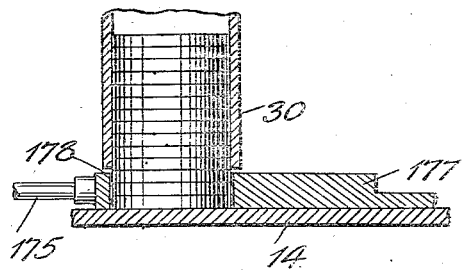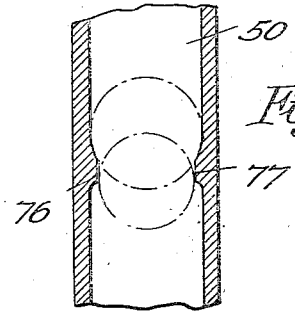

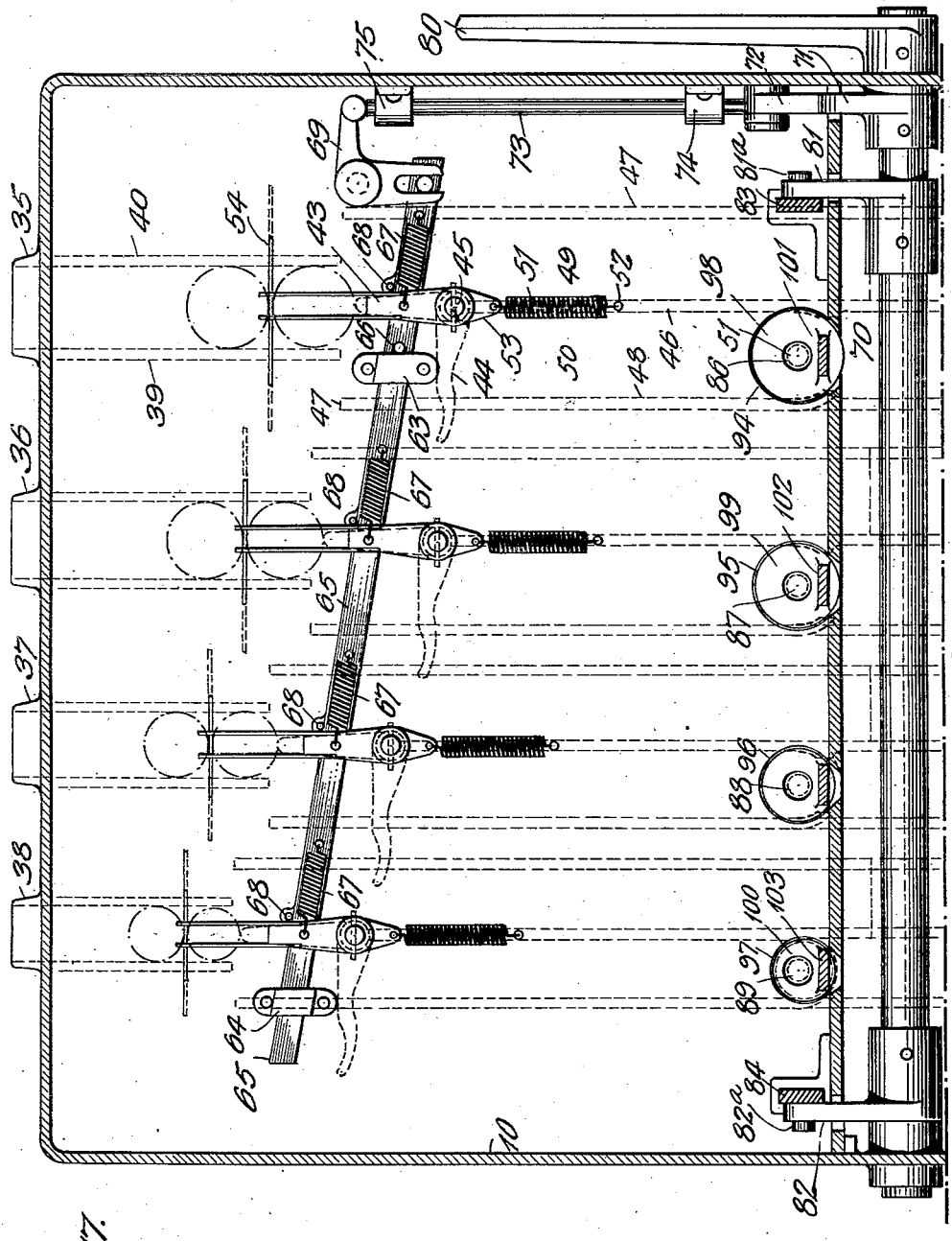

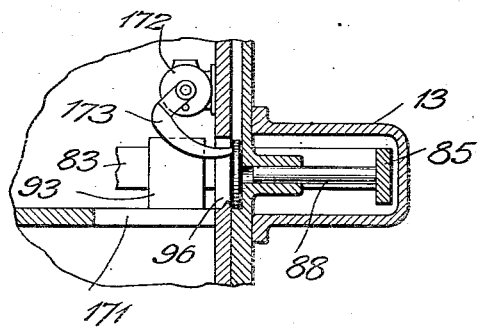
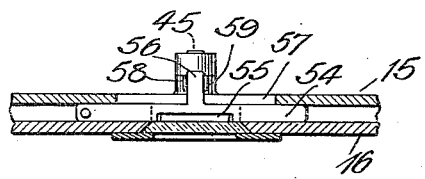
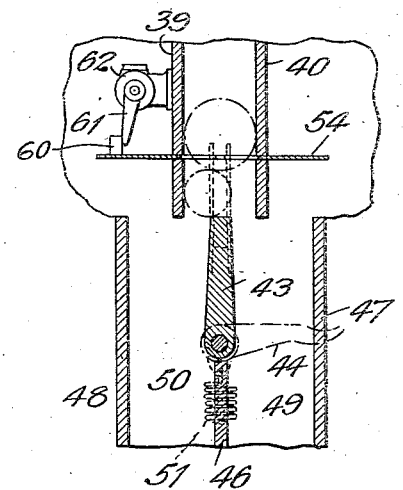

1,801,796

UNITED STATES PATENT OFFICE

CHARLES E. CHALMERS, OF NEW YORK, N. Y.

FARE-COLLECTING MACHINE

Application filed April 13, 1923, Serial No. 631,783. Renewed May 15, 1929.

This invention relates to multiple fare collecting machines, and while the embodiment herein illustrated is described as being utilized for collecting fares on motive vehicles, it is to be understood that the invention is not limited to such use, as it will be readily manifest from the following description and the accompanying drawings, that it has numerous other kindred uses and applications.

The invention has to do with a simple and improved construction which is not only capable of receiving the exact fare, but which will return the necessary change whenever a passenger drops a coin therein of a denomination or value higher than the price of such fare, and for the purposes of elucidating the principles of my invention, the embodiment illustrated and described is designed upon a five cent fare basis; consequently, the change returned, if any, is either five cents or a multiple thereof.

One of the more important features of the present invention is the provision of improved mechanism for receiving one or a multiple of fares from a coin deposited in the machine, in conjunction with improved mechanism employed in connection therewith for registering the exact number of fares taken from said coin, or, more broadly stated, for registering the net amount of cash received in or collected by the machine.

A machine of this character must necessarily be as compact as possible and at the same time equipped with mechanism for carrying a substantial amount of change, and to those ends, the same is provided with a plurality of rotatable change carriers, each of which has a plurality of coin pockets radiating from its axis of rotation, suitable mechanism being provided in the machine for imparting a predetermined amount of rotary motion to the carrier upon each actuation of the machine to return change therefrom, with a view of bringing the succeeding pockets in operative position to discharge coins therefrom so that all of said pockets in any particular carrier will be emptied at substantially the same time.

It is important in a machine of this character to provide mechanism which will enable the collection of a plurality of fares from the coins of higher denomination which have been deposited. The specific embodiment of my invention herein illustrated and described is provided with such mechanism and the same is so constructed and arranged that it will collect one, two, three, four or five fares from a quarter, a half dollar or a dollar, and after setting the same for the number of fares to be registered, or rather collected, the same will not be registered on the machine after the deposit of the coin until the operating handle has been actuated. This prevents tampering by unauthorized persons. When a ten cent piece has been deposited, it will register one or two fares, but if only one fare is collected from the coin, the proper amount of change will be returned. It will, of course, be understood that when the exact fare is deposited (in this case a five cent piece) no change will be returned, and incidentally no change mechanism will be actuated, but that the receipt of the same will be properly registered. The machine is equipped with improved manually operated means, preferably on the top thereof, for controlling or determining the number of fares to be collected from any particular coin of a higher denomination than that of the exact fare charged.

In the embodiment of my invention illustrated and described herein, the coins utilized for making change comprise preferably only five and twenty-five cent pieces, as that reduces very materially the bulk of the machine as compared with a machine embodying the same principles, and which utilizes only one coin or a different group of coins for making change. On the other hand, this enables the mechanism to be reduced to a much simpler form, as compared with the machine embodying the same principles and which is equipped to return more than the stated number of change coins. However, it will be readily apparent that the invention is not limited in this respect to the specific form hereinafter described and illustrated in the accompanying drawings, nor is it to be understood that the invention is to be limited to a form of machine capable of receiving only a five cent fare. In short, the principles are the same irrespective of the number of coins utilized for making change, and irrespective of the fare charged.

It will also be understood that a machine of this character must necessarily be capable of collecting fares in the least possible amount of time so as to expedite the handling of a large number of passengers. To that end I have preferably provided a plurality of coin receiving chutes corresponding to the different sizes of coins and into which the various sizes of coins may be simultaneously deposited and change simultaneously discharged or returned from the same. In other words, a plurality of coin chutes are provided for receiving the coins of various denominations and change may be returned for the particular coin deposited in each slot to a corresponding change return receptacle accessible to the passenger. Furthermore, the deposit of one coin in one slot will not preclude the deposit of a similar coin in the same chute before actuation of the machine. For instance, a plurality of five cent pieces may be deposited in the five cent coin chute before the machine is operated to receive any one of said five cent pieces.

One of the serious objections heretofore of all coin operated machines, is the fraudulent use made of the same by the deposit therein of slugs and spurious coins. This objection is entirely overcome in this machine for the reason that any slug or spurious coin dropped into any of said chutes may be readily returned by the operator without interfering in the least with the receiving of the genuine coins deposited. Provisions are also made to take care of a situation where a genuine coin of one size is deposited in a chute of a larger size by mistake. It is one of the more important features of this invention, therefore, to provide for such a condition by the return of the same to the passenger for deposit in the proper chute, or at any rate in making proper restitution to the passenger who has made this bona fide mistake. It goes without saying that any fraudulent attempt to deposit one coin of lower denomination into a chute for receiving coins of a higher denomination for the purpose of receiving more change than what the passenger is entitled to would obviously be frustrated.

In keeping with the foregoing, mechanism is provided under the control of the operator for directing the lowermost coin in said chutes at will either into a passageway leading the same to an operative position in the machine, or into a passageway to enable the return of the coin deposited, in combination with simultaneously operated means for arresting the movement of the succeeding coin or coins that happen to be deposited in the chutes thereby avoiding the danger of jamming the machine. This means for arresting the movement of the succeeding coin or coins in the chutes is so constructed and arranged that it will function irrespective of the sequence or mistakes made in depositing the particular coin in the proper chute. For instance, the device will properly function even if a ten cent piece or a plurality of ten cent pieces are deposited in the five, twenty-five or fifty cent chutes, as the improper coin or coins deposited may be returned to the passenger.

The actuation of the change return mechanism is accomplished through the intermediary of the coins after the same have been properly located in operative position in the machine. Remembering that the coins are arrested in the chutes for inspection and orderly selection, and that means must be provided for thereafter directing said coins into proper position for actuating the change return mechanism through the intermediary of the same, it will be understood that some positive means must be employed to enable a sufficient lapse of time after the release of the coins from their arrested position to enable the same to travel to operative position before the change return mechanism is actuated. In the present embodiment of my invention this is accomplished by oscillating the main operating shaft in one direction to release the coin or coins from their arrested position and thereafter oscillating said shaft in the other direction to actuate the change return mechanism. The mechanism for accomplishing this result is an important feature of my invention.

Another of the more important features of this invention is the incorporation in a machine of this type of simple mechanism to take care of all of the features above related, and in the ability of the machine to be readily applied to collecting machines of general application and use.

Other objects, advantages and features of construction and mode of operation will be more clearly apparent from the detailed description below taken in connection with the accompanying drawings, in which:

Fig. 2 is a view similar to Fig. 1, illustrating the position of the parts after having returned four nickels in change for the twenty-five cent piece deposited.

Fig. 4 illustrates the position of the control mechanism for collecting and registering three fares from a quarter, half-dollar or a dollar.

Fig. 5 illustrates the position of the parts of the control mechanism for collecting five fares from a quarter, half dollar or a dollar.

Fig. 6 illustrates the controlling mechanism for the ten cent pieces deposited. It is set for collecting one fare.

Fig. 7 is an elevation showing the counter or register, the ratchet wheel for actuating the same, and the mechanism for controlling the movement of said wheel upon each operation of the machine.

Fig. 8 is a vertical section taken on the line 8—8 of Fig. 2, illustrating the parts in position for returning four nickels in change.

Fig. 9 is a view similar to Fig. 8, illustrating the parts in position for returning no change.

Fig. 10 is a horizontal section taken on the line 10—10 of Fig. 2, illustrating the construction of the nickel ejector and how it is housed in the base plate to enable the plunger to pass thereover.

Fig. 11 is a sectional view taken on the line 11—11 of Fig. 1.

Fig. 12 is a sectional elevation showing one of the fixed vertical magazines adjacent one of the spoked change carriers to hold the quarters necessary to complete the change for the fifty cent pieces and taken on the line 12—12 of Fig. 1.

Fig. 13 is a longitudinal section of the quarter ejector employed in connection with the mechanism for returning change for fifty cents, one quarter being returned thereby.

Fig. 14 is a longitudinal section of the quarter ejector employed in connection with the mechanism for returning change for a dollar, three quarters being returned thereby.

Fig. 15 is a section through one of the coin chute passageways showing how the correct coin is arrested in operative position and also showing how any coin of lower denomination will pass through and fall into a special receptacle provided for that purpose.

Fig. 16 is a detail view of the mechanism employed to receive the five cent pieces deposited.

Fig. 17 is an elevation showing in normal position the improved mechanism not only for enabling spurious coins or slugs to be readily detected and ejected from the machine, but also for enabling the genuine coins to be directed into operative position in the machine.

Fig. 18 is a fragmentary sectional view of the connecting bar and coin arresting members after the latter have been actuated to enable the lowermost coin in each chute to be directed into operative position in the machine.

Fig. 19 is a fragmentary sectional view illustrating the connecting bar in normal position and also illustrating one of the coin arresting members as having been manually actuated to return a bad coin from one of the chutes.

Figs. 20 and 21 are detail views illustrating respectively the mechanism employed for actuating the connecting bar, the former illustrating such mechanism in normal position and the latter the position which the parts assume to enable the coins in the chute to be directed to their operative position in the machine.

Fig. 22 illustrates the condition where a ten cent piece has been accidentally deposited in the fifty cent coin chute.

Fig. 23 is an enlarged fragmentary view taken on the line 23—23 of Fig. 1.

Figure 1:
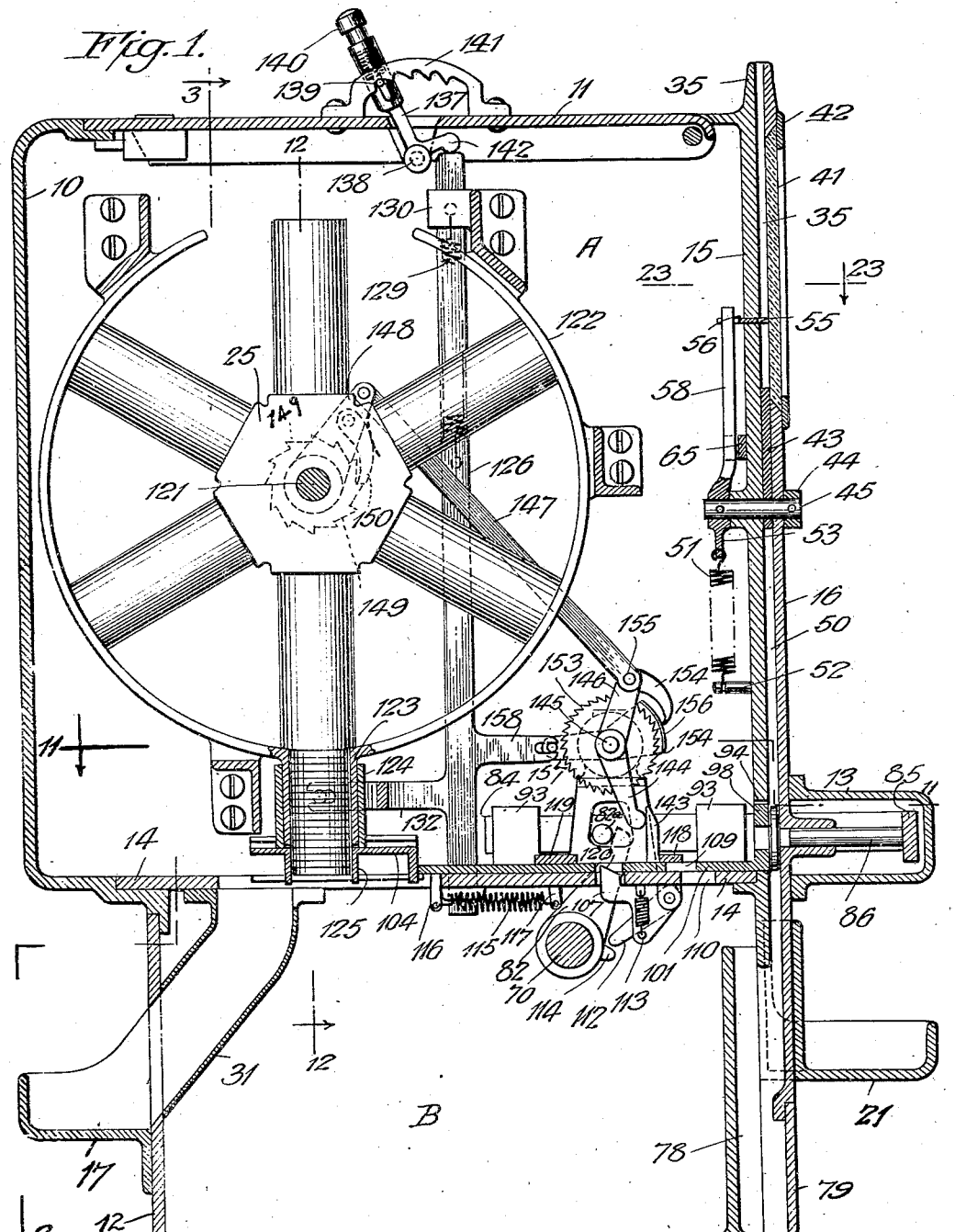
Fig. 1 is a sectional elevation showing the controlling mechanism in normal position ready to collect and register one fare and eject four nickels, a twenty-five cent piece having been properly deposited in operative position through the proper coin chute.
Figure 3:
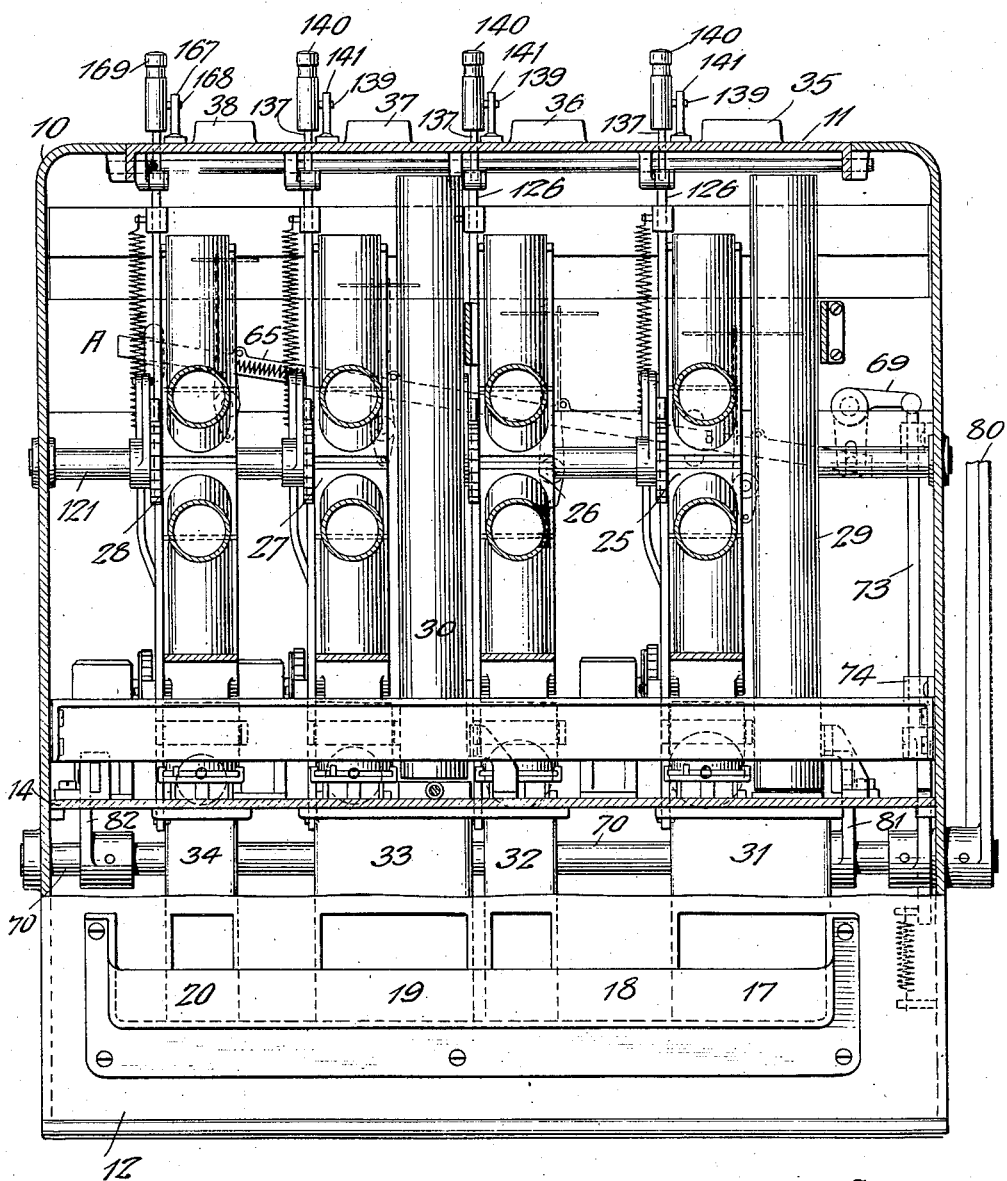
Fig. 3 is a section taken on the line 3—3 of Fig. 1.

It may be stated briefly that the specific form of machine illustrated and described herein is provided with four rotatable change carriers in connection with two of which there is provided stationary magazines employed for the return of a portion of the change for a dollar, and also a portion of the change for a fifty cent piece, each of said magazines being equipped with a stack of twenty-five cent pieces. The pockets of the rotatable carriers, in the embodiment of the invention illustrated, carry stacks of five cent pieces. The purpose of the stationary magazine is to do away with the necessity of making provisions for carrying so many five cent pieces in those rotatable carriers with which they are associated.

Assuming that only one fare is to be paid, the change for a dime is a nickel; the change for a quarter is four nickels; the change for a fifty cent piece is one quarter and four nickels; and the change returned for a dollar is three quarters and four nickels. This arrangement is preferred only because it materially simplifies the construction of the machine. The change for a dollar is obtained by handing the operator the bill which he keeps in his pocket. He then pulls the special dollar change handle which delivers to the passenger the proper change after deducting one, two, three, four or five fares, and simultaneously registers the receipt of said fares on a suitable counter or register employed in conjunction therewith.

Referring to the drawings in detail, the reference numeral 10 designates a suitable housing which may be made of one or more parts, and which is preferably provided at its top with a pivoted closure 11 (see Fig. 1) and at its side with a removable closure 12, the former being employed to afford access to the change mechanism, and the latter to provide access to the compartment into which the coins deposited by the passengers are received by the machine. The machine is also provided with an attached compartment 13 to receive or enclose a part of the change-return actuating mechanism, a horizontally arranged base plate 14, the vertical front wall members 15 and 16 cooperating to form the coin chutes and coin passageways, change receiving trays 17, 18, 19 and 20, and slug or spurious coin receiving trays 21, 22, 23 and 24. The horizontally arranged base plate 14 not only serves as a support for certain mechanism for the machine, but also to divide the housing into a compartment "A" which contains chiefly, the rotatable carriers 25, 26, 27 and 28, the magazines 29 and 30, and the mechanism for ejecting the coins from the carrier pockets and magazines, and a compartment "B" which serves, among other things, as a receptacle to receive the coins deposited by the passengers and through which extend the passageways 31, 32, 33 and 34 connecting respectively the change pockets of the carriers 25, 26, 27 and 28 with the trays 17, 18, 19 and 20. The change-return passageway 31 for the fifty cent pieces deposited connects with the tray 17; the change-return passageway 32 for the twenty-five cent pieces deposited connects with the tray 18; the change-return passageway 33 for the dollar delivered to the operator connects with the tray 19; and the change-return passageway 34 for the dimes deposited by the passenger connects with the tray 20.

I will now describe the improved mechanism employed for properly locating the respective coins deposited in operative position in the machine. The walls 15 and 16 are so constructed and so related to each other as to define the coin chutes 35, 36, 37 and 38 (see Fig. 17) for the initial reception of fifty, twenty-five, five and ten cent pieces respectively. The construction of the coin chutes 35, 36, 37 and 38 and their associated mechanism are substantially the same one with respect to the other, except in so far as I will more specifically point out in connection with the chute 35 to take care of a condition which is clearly illustrated in Fig. 22. Consequently, it is only necessary to describe in detail the construction and mode of operation of one of the coin chutes and its associated mechanism and for this purpose I have selected that one indicated by the reference numeral 35 which is employed or rather designed to receive the fifty cent pieces deposited by the passengers.

In the embodiment of the invention illustrated the coin chute 35 is formed by the inter-relation of the wall members 15 and 16 and the guide ribs 39 and 40 on the former. The wall 16 is provided with a bevelled transparent member 41 (see Fig. 1) held in a correspondingly shaped opening therein by means of a suitable clamping member 42. The object of the transparent member is to make a visual inspection of the coin after the same has been deposited by the passenger to determine whether or not it is genuine or spurious. The width and thickness of the coin chute in this particular instance is substantially equal to the diameter and thickness respectively of a fifty cent piece so that the latter passes freely therethrough. In the instance shown, the chute itself is deep enough to receive four coins, but it is understood that it may be made any depth desired to receive any predetermined number of coins. Located immediately below the coin chute 35 is a coin arresting member 43 adapted to be rocked manually in one direction by the operating handle 44. The coin arresting member 43 and the operating handle 44 are mounted upon the oscillating pintle 45. In alignment with the coin arresting member 43 is a vertical guide rib 46 located in a plane passing midway between the guide ribs 39 and 40 of the chute, and offset from the latter are two guide ribs 47 and 48. The ribs 46 and 47 define a passageway 49 leading to the return tray 21, whereas the ribs 46 and 48 define a passageway 50 which conducts or delivers the coins into operative position in the machine, as illustrated in Fig. 1. It may be stated at this point that when the coin arresting member 43 is rocked in a clockwise direction, as viewed from Fig. 18, the lowermost coin in the chute is delivered into operative position in the machine and when rocked in a counter-clockwise direction, as viewed from Fig. 19, the coin will be returned or ejected from the machine. The coin arresting member 43 is rocked in an anti-clockwise direction by means of the lever 44. It is rocked in a clockwise direction by mechanism connected to the main operating shaft of the machine and described in detail below.

Mechanism is provided for automatically maintaining the coin arresting member 43 in a substantially vertical (normal) position with a view of arresting the coins in the coin chute and for this purpose I preferably employ a spring 51, the lower end of which is connected to a stud 52, and the upper end of which is connected to an arm 53 projecting downwardly from the pintle 45. The spring 51 is also located substantially in a vertical plane passing through the intermediate wall 46. Consequently, the spring exerts a downward pull in a vertical direction upon the arm 53, thus automatically maintaining the coin arresting member 43 in a vertical position. As clearly illustrated, the member 43 and the downwardly projecting arm 53 extend in opposite directions from each other and from the pintle 45.

If suitable provisions were not made therefor, all of the coins in the coin chute would drop into one or the other of the passageways 49 and 50 leading from said chute upon the movement of the coin arresting member 43 to the right or left, as illustrated in Figs. 18 and 19. To avoid this I have provided a slide 54 (see Fig. 23) having a slot 55 therein, slidable back and forth across the coin chute and located a distance from the bottom of said chute corresponding to the diameter of the coin in the particular chute.

The slide 54 is equipped with a rearwardly extending arm 56 projecting through a slot 57 in the wall member 15 and adapted to be engaged by the resilient members 58 and 59 which are connected to the pintle 45 and are so constructed and arranged that when the pintle is operated in a clockwise or counterclockwise direction, said resilient members will coact with said arm 56 to actuate the slide 54. The normal position of the slide 54 is clearly indicated in Fig. 17, with the slot 55 therein normally registering with the coin chute 35 so as to enable the coins to pass therethrough. When the coin arresting member 43 is operated in a clockwise direction by mechanism to be described in detail below, a substantially corresponding movement is imparted to the slidable member 54, bringing one of the unslotted end portions of the slide into the path of the next succeeding coin, thus preventing the latter from being discharged simultaneously with the lowermost coin in said chute into the passageway 50. If the coin arresting member 43 is operated in a counterclockwise direction by means of the lever 44, a substantially corresponding movement will be imparted to the slidable member 54 in a direction opposite to the direction previously described, bringing the other unslotted end portion of the slide into the path of the next succeeding coin in the coin slot, thus enabling only the lowermost coin in the chute to be delivered to the return passageway 49 of the machine.

I have previously referred to a certain condition which is inherent in the embodiment of the invention illustrated, due to the accidental deposit of a coin of one size into a chute for the reception of coins of increased sizes. There is no coin in use smaller in size than the ten cent piece, consequently, the slidable member 54 may be and is preferably located at a distance from the upper end of the coin arresting member 43 equal to the diameter of that coin. For the same reason, the slidable member 54 employed in connection with the five cent and twenty-five cent coins deposited, may be located at a distance from the upper end of the coin arresting member 43 equal to the respective diameters of these coins. However, this is not true with respect to the fifty cent coin chute, because of the relative diameters of the ten cent and fifty cent pieces. In other words, if the slidable member 54 be located at a distance from the upper end of the coin arresting member 43 equal to the diameter of the fifty cent piece, it will be readily apparent that if a ten cent piece is accidentally dropped into the said fifty cent coin chute (see Fig. 22) the next coin, say a fifty cent piece, would pass sufficiently far through the slot 55 as to militate against the effective operation of the slidable member 54, or may even pass through said slot upon the actuation of the coin arresting member 43 in either direction. Consequently, I locate the slidable member 54 in this particular instance in a plane somewhat below the upper edge of the lowermost fifty cent piece in the chute, as clearly illustrated in Fig. 22. In other words, the slidable member 54, so far as the fifty cent chute is concerned, is located at a distance from the upper end of the coin arresting member substantially less than the diameter of the coin itself.

Improved means will be described below for counting the net amount of fares received by the machine. This is accomplished by the operation of the machine to return change and to receive the fare. It is desirable to record the number of bad coins deposited and rejected from the machine and this I do (see Fig. 22) in the present embodiment of my invention, preferably by causing a stud 60 on the slide 54 to engage with and actuate the spring-pressed arm 61 of a suitable counter 62 whenever the coin arresting member 43 is actuated in a counterclockwise direction to eject the coin from the machine.

Slidably mounted in the brackets 63 and 64, (see Fig. 17) and located upon the interior of the wall 15, is an arm 65. This arm is limited in its movement in one direction by the engagement of the stud 66 thereon with the bracket 63 and is normally held in such position by means of the springs 51 connected to the coin arresting members 43. The latter are resiliently connected to the slidable member 65 by means of springs 67. These springs normally maintain the coin arresting members 43 in contact with suitable studs 68 on said slidable arm 65. The normal position of the various parts is clearly illustrated in Fig. 17. The slidable arm 65 is equipped with a pin and slot connection at one of its ends with a bell crank lever 69 for actuating the same. The bell crank itself is actuated by the operation of the main shaft 70 through the intermediary of the arm 71 (see Figs. 20 and 21) projecting upwardly therefrom, the double arm member 72 pivoted to the side wall of the machine, and the rod 73 slidably mounted in the brackets 74 and 75 also secured to the side of the machine. It will be readily apparent from a casual inspection of Figs. 17 to 21 inclusive that a counterclockwise movement of the main operating shaft 70 will result in a movement of the slidable arm 65 to the right as viewed in Fig. 17, to the position clearly indicated in Fig. 18, thus enabling the lowermost coin in each of the coin chutes to be dropped into the passageway 50 to operative position in the machine. If it happens that there is a slug deposited in the lowermost position of the coin chute, it is only necessary to pull down on the lever 44, thereby moving the coin arresting member 43 to the position clearly illustrated in Fig. 19, thus enabling the slug to be discharged into the passageway 49, and ejected from the machine.

Recapitulating, it may be briefly stated that the coins are deposited by the passengers in the chutes 35, 36, 37 and 38. The lowermost coin in each chute rests upon the coin-arresting members 43. If any one of these happens to be a bad coin it may be discharged or returned by the manual manipulation of the lever 44, as indicated in Fig. 19. The operation of this lever actuates the slide 54 to prevent the downward movement of the next succeeding coin in that particular chute until the coin-arresting member 43 is brought back to normal position under the tension of the spring 51. After the bad coins, if any, have been ejected the main operating shaft 70 is given a slight rotation in a counter-clockwise direction, as viewed in Figs. 20 and 21, thus imparting a movement to the right of the connecting bar 65 with a result that the coin-arresting members are moved in a clockwise direction to enable the lowermost coin in each chute to be directed into the passageways 50 into operative position in the machine. At the same time the slides 54 are moved to the right, as previously described, to prevent the downward movement of the next succeeding coins in the chutes. It will be readily apparent that the springs 67 which connect the coin-arresting members 43 and the bar 65 normally maintain the said members 43 in contact with the studs 68 even as against the tension of the springs 51. In operating the coin-arresting members 43 to discharge bad coins from the machine, as indicated in Fig. 19, the springs 67 are stretched and serve to return said members to normal position against the studs 68. It will also be noted that the springs 51 serve to automatically return the coin-arresting members 43 and bar 65 to normal position illustrated in Fig. 17. The levers 44 are not intended to be operated in a clockwise direction from normal position and this may be effectively prevented by providing lost motion connections in that direction between said levers 44 and the pintles 45.

It has been previously stated that a slight rotation or rather oscillation of the main operating shaft 70 in a counter-clockwise direction enables the lowermost coins in the chutes 35, 36, 37 and 38 to be directed into the passageways 50 into operative position in the machine. For actuating the change return mechanism described below the main operating shaft is thereafter given a substantial oscillation in the other (clockwise) direction. The advantage of oscillating the main shaft in one direction to direct the coins into operatve position and the oscillation of the shaft in the other position to actuate the change mechanism is that it assures a sufficient lapse of time before the change return mechanism is actuated to enable the coins to drop from the coin chutes into operative position in the machine.

To avoid the possibility of a coin of smaller denomination and size from being directed into operative position in the machine by collusion, design or otherwise, the passageways 50 are provided with offsets 76 and 77 (see Fig. 15) which arrest the proper sized coins therein in operative position but enable smaller coins to pass on through said passageway to be discharged from the lower end thereof preferably into a small receptacle 78 (see Fig. 1) employed for that purpose. Whether done by collusion or by mistake on the part of the operator this feature of my invention will serve as an appropriate telltale, and as said receptacle is accessible only to the management, any such fraudulent attempt to rob the machine or any honest mistake made will not likely be repeated. Said receptacle is accessible through a suitable closure 79.

As previously stated, the main operating shaft is indicated by the reference numeral 70, upon one end of which is mounted the actuating crank 80. Adjacent to the ends of said shaft are arm members 81 and 82, projecting upwardly through the base plate 14 and normally engaging studs 81a and 82a projecting laterally from the arms 83 and 84 of a crosshead 85. This crosshead in turn is provided with a plurality of fingers 86, 87, 88 and 89, which are adapted to engage with the coins, when the latter are located in operative position in the machine, to operate suitable mechanism which will be presently described for returning change. The arms 83 and 84, crosshead 85, and fingers 86, 87, 88 and 89 are moved inwardly by actuating the crank 80 which causes the arm members 81 and 82 to engage the studs 81a and 82a. The return of the crosshead 85, arms 83 and 84, and fingers 86, 87, 88 and 89 is effected automatically by the springs 90 and 91 upon the release of the crank 80. These parts are controlled in their to-and-fro movement by the engagement of the arms 83 and 84 with the guide members 92 and 93. It will be noted that the shaft 70 is rotatable in a clockwise direction, as viewed in Fig. 1, without imparting any movement to the arms 83 and 84 and cross-head 85. This independent movement is desirable as it gives ample time to enable the coins to be directed from the coin chutes into operative position in the machine, as previously described, before actuating the change return mechanism.

I have briefly described above the general scheme of my invention and have also described in detail the mechanism employed in depositing the various sized coins into operative position in the machine. I will now describe in detail the mechanism for receiving the coins deposited, the change return mechanism actuated through the intermediary of said coins, the controlling mechanism for determining the number of fares to be collected from the said coins, and my improved registers for counting the fares collected.

The wall 15 is provided with a plurality of perforations, 94, 95, 96 and 97, located in front of the various coins when the same have been properly deposited in operative position. Located in the perforations 94, 95 and 97 are the heads 98, 99 and 100 of the plungers 101, 102 and 103. These plungers normally engage respectively with the ejectors 104, 105 and 106 (see Fig. 11). Referring now to the coin return mechanism illustrated in Figs. 1 and 2 a sectional top plan view of which is illustrated in Fig. 11, for returning change for a fifty cent piece, it will be noted that the coin itself is in operative position. On the inward movement of the cross-head 85 in the manner previously described, the finger 86 will engage with the coin and through the intermediary of the latter will impart an inward movement to the plunger 101 and ejector 104. The device has been set by mechanism which will be more fully described below for collecting one fare from the 50¢ piece deposited. Consequently one quarter and four nickels will be returned as change. When the parts are moved to the position indicated in Fig. 2, the pawl 107 will pass through the opening 108 of the base plate 14, engage the slot 109 of the plunger and maintain the latter in the position illustrated until after a preliminary return movement of the main operating shaft 70. This preliminary return movement of the main operating shaft 70 will also enable a partial return of the cross-head 85 and finger 86 towards normal position. This releases the coin from its engagement with the head 98 and enables the same to drop through the perforation 110 into the compartment B located below the same. Simultaneously with or slightly prior to the engagement of the spring pressed pawl 107 with the slot 109 in the plunger 101, change from one of the pockets of the carrier 25 and from the magazine 29 (see Fig. 11) will be returned through the passageway 31 into the change return receptacle 17. The pivot of the spring pressed pawl 107 is equipped with an arm 112, the normal position of which is indicated in Fig. 1. This arm is movable freely in a clockwise direction around said pivot as an axis. It normally rests upon a stud 113 projecting laterally from the spring pressed pawl 107. Consequently, when the main operating shaft 70 is rotated to actuate the change return mechanism, the projection 114 thereon engages with the outer end of the arm 112 and merely cams or moves the latter out of its path. On the return movement, however, of the operating shaft to normal position from the position indicated in Fig. 2, the projection 114 on said shaft engages with the arm 112 and thereby withdraws the spring pressed pawl from its engagement with the slot 109 in the plunger 101 with the result that the latter is returned to normal position by means of the spring 115, one end of which is connected to the projection 116 of said plunger and the other end of which is connected to the projection 117, preferably located on the base plate 14. The plunger is controlled in its to and fro movement by means of guides 118 and 119. Before the plunger has completed its return movement to normal position, the projection 114 will have passed the arm 112. This enables the spring pressed pawl to be free to engage the slot 120 in the plunger and thereby effectively limit the return movement of the plunger, thus assuring that the head 98 will be properly positioned in the perforation 94. Or, if desired, the return movement of the plunger may be limited by the engagement of the projection 116 with the base plate 14, as clearly illustrated in Fig. 1.

The carrier 25 is rotatably mounted upon a shaft 121. It also rotates within the circular stationary retaining rim member 122, the top of which is open for the purpose of replenishing the pockets of the carrier with change coins and the lower end of which is provided with a downwardly extending tubular projection 123 into which the coins are fed from the pockets of the carrier 25. Telescoping this tubular projection 123 is a sleeve 124, the lower end of which is permanently but slidably connected to the ejector 104. This ejector 104 is in turn equipped with a skeletonized tubular portion 125 adapted to receive the maximum number of coins that are to be returned as change. In this instance, the maximum number is four. It will therefore be understood that the device is illustrated in Fig. 1 as being positioned to collect one fare and return four nickels to the passenger. The sleeve 124 and ejector 104 are adjustable upwardly and downwardly upon the tubular member 123. In the position illustrated in Fig. 1 the sleeve is illustrated as being at its limit so far as its upward movement is concerned. By the adjustment of this sleeve downwardly, by means which I will presently describe, the machine may be made to collect one, two, three, four or five fares, it being understood in this case that four, three, two, one or no change coins are returned. When the machine has been set to receive five fares the ejector 104 will assume the position illustrated in Fig. 5 so that when the machine is operated to actuate the change return mechanism, the plunger 101 will pass over the top of the ejector 104 and thereby not operate the same. The ejector 104 is connected to the sleeve 124 by means of a tongue and groove connection clearly illustrated in Figs. 8 and 9.

The means for selectively controlling the position of the ejector to enable it to return one, two, three or four coins and for also rendering it inoperative whenever five fares are to be collected, comprises a reciprocating member 126 held in its normal position with the stop 127 on the lower end thereof engaging with the abutment 128 projecting downwardly from the base plate 14, by means of the spring 129. The member 126 is guided in its upward and downward movement by means of a slot in the base plate 14 and the guide member 130 adjacent the upper end thereof. In its normal position the parts are so set as always to collect one fare; that is, to return four nickels in change. The member 126 is provided with a laterally projecting yoke 132, the slotted arms 133 and 134 of which straddle the sleeve 124 and engage the laterally projecting studs 135 and 136. (See Figs. 8 and 9.) It will therefore be seen that a downward movement of the member 126 will impart a corresponding downward movement to the sleeve 124 and the ejector 104. The mechanism for imparting a downward movement to the member 126 comprises a lever 137 pivoted at 138 to the lower side of the closure 11 of the machine. The lever 137 is illustrated in normal position in Fig. 1 with the pin 139 of the spring pressed plunger 140 in engagement with the first notch in the rack 141. If it is desired to collect two fares, the lever 137 will be moved in a clockwise direction until the stud 139 engages the second notch in the rack 141. This lever is provided with an arm 142 engaging the top of the member 126 so that when the lever itself is moved from the first notch to the second notch, a downward movement will be imparted to the member 126, yoke 132 and sleeve 124 so that only three nickels in change will be returned. For collecting three, four or five fares the lever 137 is moved respectively to the third, fourth and fifth notch in the rack 141, as will be clearly understood.

The plunger 101 is provided with an upwardly projecting member 143 in the path of which is located one end 144 of a lever pivoted upon the shaft 145. The other end 146 of said lever is pivotally connected to one end of a link 147. The other end of this link 147 is pivotally connected to a member 148 adapted to oscillate about the shaft 121 as a center. Fixed upon the carrier 25 is a ratchet wheel 149 adapted to be engaged by the pawl 150 located upon the member 148. It will be readily apparent from the foregoing that upon the inward movement of a plunger 101 the projection 143 will impart a clockwise movement to the lever 144—146 around its axis 145 as a center. Through the link 147 a similar clockwise movement is imparted to the oscillating member 148 and since the pawl 150 is normally in engagement with one of the teeth of the ratchet 149 a rotary movement will be imparted to the carrier 25. The mechanism just described is so designed that upon each actuation of the plunger 101 a one-twelfth revolution will be imparted to the carrier 25. This means, of course, that it will require two actuations of the plunger 101 to bring the next succeeding pocket of the carrier 25 into position to enable coins therein to be discharged therefrom into the tubular projection 123. It will be noted that the maximum number of coins that could possibly be ejected from the tubular member 123, before the next succeeding pocket in the carrier is drawn into operative position, would be eight, so it is only necessary to exercise care in designing a machine of this character that the tubular member 123 be equipped to receive at least eight coins. It will also be understood that by the lengthening of the tubular member to provide for twelve, sixteen, etc. coins therein, the mechanism may be designed so that only one-eighteenth, one-twenty-fourth, etc. revolution may be imparted to the carrier upon each actuation of the plunger 101. This is only desired, however, in relieving the machine of a portion of the strain in the operation thereof as will be readily apparent. The pivotal point 145 of the lever 144—146 is, in reality, a shaft of a suitable counter 151 which is mounted upon a base 152 (see Fig. 7) supported by the base plate 14 of the machine. This counter is equipped with a ratchet wheel 153 concentrically mounted upon the shaft 145 thereof. For actuating the ratchet 153 a pawl 154 pivoted at 155 is employed, the nose of which is normally held out of engagement with the teeth of said ratchet by means of a movable shield 156 interposed between the teeth of said ratchet and the nose of said pawl as clearly illustrated in Figs. 1 and 7. The shield 156 is concentrically mounted upon the shaft 145 of the counter and is equipped with an arm 157 which has a pin and slot connection with an arm 158 projecting laterally from the member 126. It will therefore be evident that the upward and downward movement of the slidable member 126 will effect an oscillatory movement of the shield 156 about the shaft 145 as a center. This shield is employed for the purpose of controlling the engagement of the pawl 154 with the ratchet 153 so that if only one fare is to be collected the ratchet 153 will be moved through the distance of one tooth, and if two fares are collected, it will be moved to the distance of two teeth, and so on. In the position illustrated in Fig. 1 the shield is illustrated as being in a position to hold the pawl 154 out of engagement with the ratchet 153 until the plunger 101 begins to make the last one-fifth movement when the pawl 154 will drop over the lower edge of the shield 156 and engage the ratchet and impart a movement equal to one tooth on the final stroke of the plunger as clearly illustrated in Fig. 2. The position of the shield 156 for counting three fares is illustrated in Fig. 4 and for counting five fares is illustrated in Fig. 5.

The normal position of the ejector 104 is independent of the normal position of the plunger 101. The ejector is held in its normal position with the stud 159 thereon (see Fig. 11) in engagement with some fixed part 160 by means of a spring 161 one end of which is connected to the arm 162 of the ejector and the other end of which is connected at 163 to some fixed part of the machine.

Remembering that the mechanism illustrated in Figs. 1 and 2 is designed for the return of change for a 50¢ piece, it still remains to describe the mechanism employed for returning the 25¢ piece to make up for the balance of the change to be given to the passenger. This comprises a stationary magazine 29 (see Figs. 11, 12 and 13) located in proximity to the carrier 25 in which the 25¢ pieces are carried. This magazine is spaced from the base plate 14, a distance substantially equal to the thickness of a 25¢ piece (see Figs. 12 and 13). Projecting laterally and forwardly from the plunger 101 is an auxiliary ejector 164 provided with a perforation 165 therein normally in register with the lower end of the magazine 29 as clearly illustrated in Figs. 11, 12 and 13. It will therefore be seen that upon the inward movement of the plunger 101, a corresponding movement will be imparted to the auxiliary ejector 164 with the result that a 25¢ piece will be ejected from the magazine 29 into the change return passageway 31 simultaneously with the ejection of the 5¢ pieces from the carrier 25, a suitably elongated slot 166 (see Fig. 11) in the base plate 14 being employed for that purpose.

As previously stated the chute 36 is adapted to receive the 25¢ pieces deposited which are directed by mechanism previously described by depositing the same in operative position in the machine behind the plunger 102 in front of the finger 87 of the crosshead 85. The plunger 102 and ejector 105 employed for ejecting change from the carrier 26 are similar in all respects to the plunger 101 and ejector 104 previously described except that there is no necessity for employing an auxiliary ejector and a magazine corresponding respectively to the ejector 164 and magazine 29. This will be readily understood for the reason that the ejector 105 takes care of the return of only the necessary change of the 25¢ pieces deposited. Likewise the controlling mechanism for determining the amount of change to be returned and also for registering the exact number of fares collected, is similar to that already described in the return of change for the 50¢ pieces deposited.

The 10¢ pieces deposited in the chute 38 are directed in operative position in the machine behind the plunger 103 and in front of the finger 89 of the crosshead 85. The plunger 103 and the ejector 106 are likewise similar to the plungers 101 and 102 and the ejectors 104 and 105, but in this instance there is no necessity for returning more than one piece of coin in change. Consequently the rack 167 (see Fig. 6) is provided with only two notches, the normal position of which is clearly illustrated in said Fig. 6 and enables the return of one fare. When the stud 168 of the lever 169 is moved into the second notch the vertically movable member 170 will be moved downwardly in the manner previously described and sufficiently to enable the ejector 106 to be moved out of the path of the plunger 103 in consequence of which the latter passes over the upper edge of the former, with the result that no change is returned. The construction and mode of operation of the slidable member 170 is the same in all respects as the slidable member 126 previously described. In fact, they may be made interchangeable if so desired.

The 5¢ pieces, as previously described, are deposited in the chute 37 and are directed by the mechanism previously described to operative position in front of the finger 88. (See Fig. 16.) But as no change is to be returned, the 5¢ piece so deposited will be engaged by the finger 88, upon the actuation of the mechanism, and be discharged through the perforation 171 into the receptacle B of the device. Each time that the machine is operated to receive the 5¢ pieces so deposited, a suitable counter 172 will be actuated by the engagement of the coin with the arm 173 of said counter.

Where change is to be made for a dollar, the coin or the bill, as the case may be, is handed to the operator who actuates the plunger 174 (see Fig. 11) through the member 175. The plunger 174, ejector 176 and auxiliary ejector 177 are similar in all respects to the plunger 101, ejector 104 and auxiliary ejector 164 except that the plunger 174 is not provided with a head corresponding to the head 98, and except that the auxiliary plunger 177 is of a thickness to receive three 25¢ pieces in the perforation 178 therein, said perforation, as will be clearly apparent from an inspection of Fig. 14, being in alignment with the 25¢ piece magazine 30. Ejector 176 discharges the 5¢ pieces from the change carrier 27. The mechanism employed in this connection for controlling the number of change coins to be returned and for registering the number of fares collected, is identically the same as the mechanism already described and employed in connection with the return of change for a 50¢ piece deposited as illustrated in Figs. 1, 2, 4 and 5.

It has already been stated that the plunger 101 serves to bring the succeeding pockets of the carrier 25 into operative position to discharge coins into the tubular member 123. The plunger 102 is constructed in the same fashion to bring the succeeding pockets in the carrier 26 into position to enable the coins to be fed from said pockets into a similar tubular member located in a stationary retaining rim member and similar to that indicated by 123 in Fig. 1. The plunger 174 serves to bring the succeeding pockets in the carrier 27 to discharge into a tubular member corresponding to the tubular member 123 illustrated in Fig. 1 The plunger 103 likewise serves to effect a rotation of the carrier 28 for the purpose now understood from the foregoing. An elongated slot 180 corresponding to elongated slot 166 previously described is provided in connection with the ejectors 176 and 177 so as to enable the 5¢ and 25¢ pieces to be returned through the passageway 33 to the change return receptacle 19. The ejector 105 discharges the change from the carrier into the passageway 32 leading to the change return receptacle 18 and the ejector 106 discharges the change from the carrier 28 into the passageway 34 leading to the change return receptacle 20.

From the foregoing it will be seen that in the improved machine a plurality of coins may be deposited in each of the coin chutes 35, 36, 37 and 38; that bad coins can be ejected from any one of said chutes without interfering with the coins in the other chutes; that it enables the location at the same time of one coin of each denomination in operative position in the machine with a result that change may be simultaneously returned from a plurality of coins; that if a coin is accidentally deposited in the wrong chute it can be returned and if not returned it will pass on through the passageway to a receptacle provided for that purpose; that the coins in the chutes are fed successively into operative position in the machine; that the mechanism for controlling the amount of change to be returned serves also to control the register for counting the exact number or fares collected; that the machine is capable of receiving and registering the exact fare; that from the coins of higher denomination deposited one or multiple fares may be collected therefrom; that the location of the coins in operative position and the actuation of the change making mechanism is all effected by the actuation of the main operating crank of the machine; that the device as a whole is of very compact form; that the construction is simple, cheap to manufacture, and not liable to get out of order; that all possible danger of the machine being prematurely operated is avoided; and that the invention is adapted to be employed generally with change-making machines. It will therefore be seen that the device is particularly desirable and advantageous in the expeditious handling of a large number of passengers, thus avoiding conjestion about the machine and the inevitable delay incident thereto.

I have illustrated and described what I now consider the preferred form of my invention. A number of the parts have been illustrated more or less diagrammatically and the size, proportion and construction of the various elements shown in this present embodiment are intended to serve for illustration purposes only. To avoid prolixity of description duplicate parts have been omitted. It is therefore to be expressly understood that I do not limit myself to the exact construction herein illustrated and described as many changes may be made in points of detail and various other embodiments resorted to without necessarily deviating from the true spirit and scope of my invention.

What I claim is:—

1. A change making machine comprising, change return mechanism, a coin chute for successively receiving a plurality of coins, a passageway for conducting the coins from said chute to their operative positions in the machine, a passageway for conducting said coins directly from said chute to the exterior of the machine, means for arresting the coins in said chute to enable them to be inspected, mechanism for actuating said arresting means to enable the lowermost coin in said chute to be discharged into either of said passageways, said mechanism comprising means for actuating the change return mechanism of the machine, and simultaneously actuated means for arresting the movement of the succeeding coin or coins in said chute.

2. A change making machine comprising, change return mechanism, a plurality of coin chutes each adapted to hold a plurality of coins, a passageway for each of said chutes for conducting coins from the latter to their operative position in the machine, a passageway for each of said chutes for conducting coins directly from said chutes to the exterior of the machine, means for arresting the coins in said chutes to enable them to be inspected, mechanism for actuating said arresting means to enable the lowermost coins in said chutes to be discharged into said passageways, said mechanism comprising means for actuating the change return mechanism.

3. A change making machine comprising, change return mechanism, a chute for holding a plurality of coins, a passageway leading to the machine and a passageway for ejected coins, in combination with mechanism for successively discharging the coins from said chute selectively into one of said passageways, said mechanism comprising means for actuating the change return mechanism.

4. The construction of a change making machine as defined in claim 3, in combination with means for counting the coins rejected.

5. A change making machine as defined in claim 3, in combination with automatic means for restoring the coin arresting means to normal position.

6. A change making machine comprising a plurality of movable change carriers, a coin chute corresponding to each of said carriers for receiving the coins deposited for change, means for locating the coins of different denominations in different positions, means common to the carriers and acting through the intermediary of the coins deposited to discharge the required change, and manually operable means for selectively controlling the amount of change to be returned.

7. A change making machine comprising a plurality of movable change carriers, a chute corresponding to each of said carriers for receiving the coins deposited for change and for locating the coins therein of different denominations in different postions, and means common to the carriers and rendered operative by the deposited coin for ejecting change from one of the carriers, in combination with manually operable means for selectively controlling the number of fares to be collected out of said coin.

8. A change making machine comprising a movable change carrier, a chute for receiving the coin deposited, and means rendered operative by the deposited coin for ejecting change from said carrier, in combination with manually operable means for selectively controlling the number of coins to be ejected from said carrier upon the operation of said ejecting means, and means for moving said carrier.

9. A change making machine comprising a plurality of change carriers therein, means for simultaneously receiving a plurality of the deposited coins in operative position in the machine, ejecting mechanism located in operative relationship to the change in each of said carriers, means rendered operative by the deposited coins for actuating said ejecting mechanism, and manually operable means for selectively controlling the number of change coins to be ejected from said carriers upon the actuation of said ejecting mechanism.

10. A change making machine comprising a plurality of change carriers, means for receiving deposited coins, ejecting mechanism located in operative relationship to one of the carriers to discharge change therefrom, means rendered operative by the deposit of a coin for actuating said ejecting mechanism, and common means for controlling the number of change coins to be ejected from said carrier upon the actuation of said ejecting mechanism and for registering the number of fares collected therefrom.

11. A change making machine comprising a plurality of movable change carriers therein, means for receiving deposited coins, ejectors corresponding to the denomination of coins deposited and located in operative relationship to said carriers, means common to said ejectors and rendered operative by the deposit of coins of different denominations for actuating the ejectors corresponding to the denomination of coins deposited, means for controlling the number of change coins to be ejected from the carriers, and means for moving the carriers by the movement of the ejectors corresponding thereto.

12. A change making machine comprising a plurality of change carriers, chutes for simultaneously receiving a plurality of deposited coins in operative position in the machine, mechanism for each of said carriers for ejecting change therefrom, mechanism rendered operative by the deposited coins for actuating said ejecting mechanism, means for normally arresting the coins in the coin chutes, and means operated by said actuating mechanism for rendering the coin arresting means inoperative.

13. A change making machine comprising a plurality of change carriers, and means rendered operative by the deposited coins for ejecting change from said carriers, in combination with common means for controlling the number of coins to be ejected from each of said carriers and for registering the number of fares collected.

14. A change making machine comprising a plurality of movable change carriers, an ejector mechanism for each of said carriers, and means common to all of said ejectors for actuating any one of the same, said means being rendered operative by the deposited coins for which change is to be made, means for controlling the number of coins to be ejected from the carriers containing the change coins of higher denomination, and means for moving the carriers by the movement of the ejectors corresponding thereto.

15. A change making machine comprising a plurality of coin chutes, a plurality of change carriers, ejector mechanism for each of said carriers, and means common to all of said ejector mechanisms for actuating the same in accordance with the denomination of the coins deposited, in combination with means for arresting the coins in said chutes, and means actuated by the first mentioned means for rendering the coin arresting means inoperative.

16. A change making machine comprising means for simultaneously depositing coins of different denominations, a plurality of change carriers, ejector mechanism for each of said carriers, normally inoperative mechanism common to all of said ejectors for actuating the same, said mechanism being provided with means co-operating with the coins deposited to render the same operative to simultaneously actuate a plurality of said ejector mechanisms, and manually operable means for selectively enabling said ejector mechanisms to discharge one or more change coins.

17. A change making machine comprising a plurality of rotatable change carriers each of which is equipped with a plurality of pockets, a chute common to each of said carriers for receiving the coins deposited for change, means for directing the coins of different denominations in operative position, and an ejector means common to a plurality of said carriers for simultaneously ejecting coins from a pocket thereof to discharge the required change, and means for actuating said ejector means through the intermediary of the coin deposited and for rotating the carriers to bring the succeeding pocket into operative position.

18. A change making machine comprising a plurality of movable change carriers provided with a plurality of pockets for receiving change for coins of different denominations, means for receiving deposited coins in different positions corresponding to the different denominations, means rendered operative by the deposit of a coin for ejecting change from one of the pockets of said carriers, and means for determining the number of coins to be ejected from each of said carriers, in combination with means for automatically moving said carriers to bring the succeeding pockets into operative relationship to said ejecting means.

19. A change making machine comprising a movable change carrier therein, means for receiving the deposited coins, ejecting mechanism located in operative relationship to the change carrier, means rendered operative by the deposit of a coin for actuating said ejecting mechanism, and common means for determining the number of coins to be ejected from said carrier, for moving said carrier and for registering the number of fares collected.

20. A change making machine comprising a change carrier therein, means for receiving deposited coins, ejecting mechanism located in operative relationship to the change carrier to discharge change therefrom, means rendered operative by the deposit of a coin for actuating said ejecting mechanism, means rendering said ejecting means normally inoperative to return any change, and common means for rendering said ejecting mechanism operative to return a predetermined amount of change and for registering the number of fares collected.

21. A change making machine comprising a plurality of carriers therein for receiving change for coins of different denominations, means for receiving deposited coins, an ejector located in operative relationship to each of said carriers, means common to said carriers and rendered operative by the deposit of coins of different denominations for actuating that ejector corresponding to the denomination of coin deposited, means for rendering said ejecting means inoperative to return any change, and common means for rendering said ejecting mechanism operative to return a predetermined amount of change and for registering the number of fares collected.

22. A change making machine comprising a change carrier, a chute for receiving deposited coins in operative position in the machine, an ejector cooperating with said carrier for ejecting change therefrom, mechanism rendered operative by the deposit of coins for actuating said ejector, means for normally arresting the coin as it passes into the coin chute to enable it to be inspected, means actuated by the movement of said mechanism in one direction for rendering the coin arresting means inoperative, and means for rendering said ejector operative to return a predetermined amount of change.

23. A change making machine for registering multiple fares, comprising a plurality of change carriers, a chute corresponding to each of said carriers for receiving the coins deposited for change and for locating the coins therein of different denominations in different positions, means common to the carriers and rendered operative by the coins deposited for ejecting change from said carriers, said means comprising mechanism for ejecting one or a plurality of change coins from each of said carriers.

24. A change making machine as defined in claim 2, in combination with automatic means for restoring the coin arresting means to normal position.

25. A change making machine as defined in claim 3, in combination with automatic means for restoring the coin arresting means to normal position.

26. A change making machine as defined in claim 3, in combination with automatic means for restoring the coin arresting means to normal position.

27. A change making machine comprising, change return mechanism, a chute for holding a plurality of coins, a passageway leading to the machine and a passageway for ejected coins, in combination with mechanism for successively discharging the coins from said chute selectively into one of said passageways, said mechanism comprising means for actuating the change return mechanism, means for counting the coins rejected in combination with automatic means for restoring the coin arresting means to normal position.

28. A change making machine comprising a chute for receiving deposited coins in operative position in the machine, a plurality of change magazines rotatably mounted upon a horizontal axis, open ends for said change magazines, a rim member to retain the coins in the magazines, a tubular projection extending from said rim member, means to bring the magazines in alignment with the tubular projection, and ejecting mechanism rendered operative by the deposited coin for ejecting change coins from said tubular projection.

29. A change making machine comprising a chute for receiving deposited coins in operative position in the machine, a plurality of change magazines rotatably mounted upon a horizontal axis, a rim member to retain the coins in the magazines, open ends in the magazines, a tubular projection extending from said rim member, means to bring the magazines in alignment with the tubular projection, ejecting mechanism rendered operative by the deposited coin for ejecting change coins from said tubular projection, and means to vary the number of coins ejected by the ejecting mechanism.

30. A change making machine comprising a chute for receiving deposited coins in operative position in the machine, a plurality of change magazines rotatably mounted upon a horizontal axis, open ends for said change magazines, a rim member to retain the coins in the magazines, a tubular projection extending from said rim member, means to rotate the change magazines to bring them successively into alignment with the tubular projection and ejecting mechanism rendered operative by the deposited coin for ejecting change coins from said tubular projection.

31. A change making machine comprising a chute for receiving deposited coins in operative position in the machine, a change magazine, a sleeve slidable upon said magazine, guides upon the sleeve and normal to the axis thereof, a coin ejector mounted upon the guides, means to selectively adjust the position of the sleeve relatively to the change magazine and adapted to maintain said sleeve in adjusted position for successive operations, and ejecting mechanism rendered operative by the deposited coin to engage the coin ejector and thereby eject varying numbers of change coins from the change magazine.

32. A change making machine comprising a chute for receiving deposited coins in operative position in the machine, a change magazine, a sleeve slidable upon said magazine, a coin ejector carried by the sleeve and movable normal to the axis thereof to eject coins from the change magazine, means to selectively adjust the position of the sleeve relatively to the change magazine and adapted to maintain said sleeve in adjusted position for a succeeding operation, and ejecting mechanism rendered operative by the deposited coin to engage the coin ejector and thereby ejecting varying numbers of change coins from the change magazine.

33. A change making machine comprising a chute for receiving deposited coins in operative position in the machine, a change magazine, a sleeve slidable upon said magazine, means to selectively adjust the position of the sleeve relatively to the change magazine, a coin ejector carried by the sleeve and movable normal to the axis thereof to eject coins from the change magazine, means to operate the coin ejector to eject change coins from the change magazine and means for maintaining said sleeve in adjusted position after the operation of said ejecting means.

34. A change making machine comprising a plurality of movable change carriers, a separate coin chute for each of said carriers for receiving different denominations of coins deposited for change, means for locating the coins of different denominations in different positions, means common to the carriers and acting through the intermediary of the coins deposited to discharge the required change, and manually operable means for selectively controlling the amount of change to be returned.

35. A change making machine comprising a change coin holder, a plurality of rotatable change carriers each of which is equipped with a plurality of pockets, a separate coin chute for each of said carriers for receiving different denominations of coins deposited for change, means for directing said coins of different denominations into operative position in the machine, and ejector means for simultaneously ejecting coins from a pocket and said holder to discharge the required change, and means for actuating said ejector means through the intermediary of the coin deposited and for rotating the carriers to bring the succeeding pocket into operative position.

36. A change making machine comprising a change carrier therein, means for receiving a deposited coin, ejecting mechanism located in operative relationship to the change carrier, means rendered operative by and including the deposited coin for actuating said ejecting mechanism, and common means for controlling the number of coins to be ejected from said carrier and for registering the number of fares collected.

37. A change making machine for registering multiple fares comprising a plurality of change carriers, a separate coin chute for each of said carriers for receiving different denominations of coins deposited for change and for locating the coins therein of different denominations in different positions, means common to the carriers and rendered operative by the coins deposited for ejecting change from said carriers, said means comprising mechanism for ejecting one or a plurality of change coins from each of said carriers.

38. A change making machine comprising a chute for holding a plurality of coins, a passageway leading from said chute to the machine and a passageway leading from said chute through which coins are adapted to be ejected, in combination with change return mechanism, means for successively discharging the coins from said chute selectively into one of said passageways, and a device movable in one direction to actuate said coin discharging means and movable in the other direction to actuate the change return mechanism through the intermediary of the coin to be changed.

39. A change making machine comprising a chute for holding a plurality of coins, a passageway leading from said chute to the machine and a passageway leading from said chute through which coins are adapted to be ejected, in combination with change return mechanism, mechanism for successively discharging the coins from said chute selectively into one of said passageways, said discharging mechanism comprising means including a deposited coin for actuating the change return mechanism.

40. A change making machine comprising change return mechanism, a chute for holding a coin, a passageway leading from said chute to the machine, and a passageway leading from said chute to the exterior of the machine, in combination with mechanism for selectively discharging said coin from said chute into either of said passageways, said mechanism comprising means adapted to actuate the change return mechanism.

41. A change making machine comprising change return mechanism, a chute for holding a coin, a passageway leading from said chute to the machine, and a passageway leading from said chute to the exterior of the machine, in combination with mechanism for selectively discharging said coin from said chute into either of said passageways, said mechanism comprising means adapted to actuate the change return mechanism and also comprising a coin arresting means adapted to be automatically restored to normal position.

42. A change making machine comprising, change return mechanism, a chute for holding a plurality of coins, a passageway leading from said chute to the machine and a passageway leading from said chute to the exterior of the machine, in combination with mechanism for successively discharging the coins from said chute selectively into either of said passageways, said mechanism comprising means adapted to actuate the change return mechanism.

43. A change making machine comprising, change return mechanism, a chute for holding a plurality of coins, a passageway leading from said chute to the machine, and a passageway leading from said chute to the exterior of the machine, in combination with mechanism for successively discharging the coins from said chute selectively into either of said passageways, said mechanism comprising means adapted to actuate the change return mechanism and also comprising means for arresting the coins in said chute to enable them to be inspected.

44. A change making machine comprising change return mechanism, a chute for holding a coin, a passageway for conducting the coin from said chute to its operative position in the machine, and a passageway for conducting the coin from said chute to the exterior of the machine, in combination with mechanism for discharging the coin from said chute selectively into either of said passageways, said mechanism comprising means for actuating a change return mechanism through the intermediary of the coin to be changed and also comprising means movable in one direction to actuate said coin discharging mechanism and movable in the other direction to actuate the change return mechanism.

45. A change making machine comprising change return mechanism, a chute for holding a plurality of coins, a passageway for conducting coins from said chute to their operative position in the machine, and a passageway for conducting coins from said chute to the exterior of the machine, in combination with mechanism for successively discharging the coins from said chute selectively into one of said passageways, said mechanism comprising means for actuating the change return mechanism through the intermediary of the coin to be changed and also comprising means movable in one direction to actuate said coin discharging mechanism and movable in the other direction to actuate the change return mechanism.

46. A change making machine comprising change return mechanism, a chute for receiving the coins deposited, a passageway leading from said chute to enable a deposited coin to be received into operative position in the machine, a second passageway to enable the return of a coin deposited, means for arresting the coins deposited in said chute to enable them to be inspected, means for actuating said arresting means to enable a coin to be directed into the second mentioned passageway, and means operated in one direction for actuating said arresting means to enable a coin to be deposited in an operative position in the first mentioned passageway and adapted to be operated in the other direction to actuate said change return mechanism.

47. A change making machine comprising change return mechanism, a chute for receiving the coins deposited, means for arresting the coins in said chute to enable them to be inspected, and means operated in one direction for actuating said arresting means to enable the coins to be deposited in an operative position in the machine and adapted to be operated in the other direction to actuate said change return mechanism.

48. A change making machine comprising change return mechanism, a chute for receiving the coins deposited, means for arresting the coins in said chute to enable them to be inspected, means operated in one direction from normal position for actuating said arresting means to enable the coins to be deposited in an operative position in the machine and adapted to be operated in the other direction from normal position to actuate said change return mechanism, and means for thereafter automatically restoring said actuating means to normal position.

49. A change making machine comprising, a change holder, an ejector in cooperative relationship with said holder, a chute for receiving and conducting a deposited coin into operative position in the machine, means for arresting the movement of the coin in said chute to enable it to be inspected by the operator, and means operable in one direction to render said coin arresting means inoperative and enable the coin to pass into operative position in the machine, and operable in the other direction whereby, thru the intermediary of the coin deposited, to operate said ejector.

50. A change making machine comprising a change holder, change return mechanism, a chute for holding a coin, a passageway leading from said chute and adapted to direct the coin to an operative position in the machine, and a second passageway leading from said chute to the exterior of the machine, in combination with mechanism for discharging said coin from said chute selectively into either of said passageways, said discharging mechanism comprising means for actuating the change return mechanism through the intermediary of the coin to be changed, and means for controlling the number of coins to be ejected from said change holder.

51. A change making machine comprising a plurality of chutes each adapted to hold a coin, a passageway leading from each of said chutes to the machine and a second passageway leading from each of said chutes through which the coin is adapted to be ejected, in combination with change return mechanism, mechanism for selectively discharging a coin from each of said chutes into either of the passageways leading therefrom, said discharging mechanism comprising means for actuating the change return mechanism through the intermediary of the coin to be changed.

52. A change making machine as defined by claim 51 in which the discharging mechanism comprises means for enabling a spurious coin or slug to be ejected through said second passageway from any one chute without interfering the coin in any other chute or chutes.

53. A change making machine comprising a plurality of chutes each adapted to hold a plurality of coins, a passageway leading from each of said chutes to the machine and a second passageway leading from each of said chutes through which coins are adapted to be ejected, in combination with change return mechanism, mechanism for successively discharging the coins from each of said chutes selectively into either of the passageways leading therefrom, said discharging mechanism comprising means for actuating the change return mechanism through the intermediary of the coin to be changed.

54. A change making machine as defined in claim 53 in which the discharging mechanism comprises means for enabling the lowermost coin or slug to be ejected from any one chute through the second passageway without interfering with the coins in any other chute or chutes.

55. A change making machine comprising a chute adapted to hold a coin, means for arresting the coin in said chute to enable the same to be inspected, a passageway for conducting said coin from said chute to its operative position in the machine, a second passageway leading from said chute through which said coin is adapted to be ejected, and means for ejecting said coin through said second passageway, in combination with change return mechanism, and mechanism including a manual operating means for successively actuating said arresting means to locate said coin in operative position in the machine and for thereafter actuating the change return mechanism through the intermediary of the coin to be changed.

In testimony whereof, I have hereunto set my hand this 31st day of March, 1923.

CHARLES E. CHALMERS.